United States Patent [19]
Matsuzuka et al.

[11] Patent Number: 5,838,972
[45] Date of Patent: Nov. 17, 1998

[54] METHOD AND APPARATUS FOR DYNAMICALLY LOADING AN INPUT RUN-TIME MODULE AND AN OUTPUT RUN-TIME MODULE

[75] Inventors: Shinobu Matsuzuka, Sunnyvale; Hidetoshi Tajima, Mountain View, both of Calif.

[73] Assignee: Sun Microsystems, Inc., Mountain View, Calif.

[21] Appl. No.: 599,319

[22] Filed: Feb. 9, 1996

[51] Int. Cl.$^6$ .................................................. G06F 9/445
[52] U.S. Cl. ......................... 395/685; 395/885; 395/500; 395/682
[58] Field of Search .................................. 395/712, 651, 395/652, 653, 680, 685, 326, 200.1, 830, 758, 751, 885, 500, 682, 884

[56] References Cited

U.S. PATENT DOCUMENTS

| | | | |
|---|---|---|---|
| 4,595,980 | 6/1986 | Innes | 395/758 |
| 4,858,114 | 8/1989 | Heath et al. | 395/527 |
| 5,157,384 | 10/1992 | Greanias et al. | 345/156 |
| 5,339,430 | 8/1994 | Lundin et al. | 395/685 |
| 5,369,766 | 11/1994 | Nakano et al. | 395/685 |
| 5,434,776 | 7/1995 | Jain | 395/758 |
| 5,499,335 | 3/1996 | Silver et al. | 395/340 |
| 5,526,268 | 6/1996 | Tkacs et al. | 395/758 |
| 5,634,058 | 5/1997 | Allen et al. | 395/712 |
| 5,644,775 | 7/1997 | Thompson et al. | 395/757 |

OTHER PUBLICATIONS

Using Wordperfect 5.1—Special Edition, Que Corporation 1989.

Jinsoo Yoon, Yangbee Yoon, Sunghun Park, and Kilnam Chon, "A Korean Environment for the X Window System", the X Resource, Issue 15, 1996.

Hidetoshi Tajima, "IM Server Developers Kit—C Language Interface", X11R6 Xi18n Implementation Group, May 15, 1994.

Masahiko Narita and Hideki Hiura, "The Input Method Protocol", Version 1.0, X Consortium, Inc., X Version 11, Release 6, 1994.

Katsuhisa Yano and Yoshio Horiuchi, "X11R6 Sample Implementation Frame Work", X Consortium, Inc., X Version 11, Release 6, 1994.

Yoshio Horiuchi, "X Locale Database Definition", X Consortium, Inc., X Version 11, Release 6, 1994.

Masahiko Narita, Takashi Fujiwara, Keisuke Fukui, Masaki Takeuchi, Makoto Matsuyama, Kazuki Nishihara, Yasuhiro Kawai, Katsuhisa Yano, Hideki Hiura, Masayuki Seino, and Katsumi Kudo, "Protocol Specification for the Distributed Input System on the X Window System", Version 11, Revision 4.0, Mar. 16, 1992.

Masahiko Narita and Makiko Shimamura, "Overview of the Input Method Protocol", The X Resource Issue 10, O'Reilly & Associates, 1994.

Sandra Martin, Internationalization in OSF/1 R1.1, Open Software Foundation.

Primary Examiner—Dung C. Dinh
Attorney, Agent, or Firm—Townsend and Townsend and Crew LLP

[57] ABSTRACT

A method implemented on a computer system for loading a module for input and for loading a module for output for an application program includes the steps of selecting the module for input, loading the module for input, selecting a module for output, and loading the module for output at a time different from the loading of the module for input.

31 Claims, 4 Drawing Sheets

METHOD AND APPARATUS FOR DYNAMICALLY LOADING AN INPUT RUN-TIME MODULE AND AN OUTPUT RUN-TIME MODULE

TRADEMARK NOTICE

Sun, Spring, Solaris, Sunsoft, and SunOS are trademarks or registered trademarks of Sun Microsystems, Inc. in the United States and other countries. All SPARC trademarks are used under license and are trademarks or registered trademarks of SPARC International, Inc. in the United States of America and other countries. Products bearing SPARC trademarks are based upon an architecture developed by Sun Microsystems, Inc. X Window System is a trademark of X Consortium, Inc.

BACKGROUND OF THE INVENTION

The present invention relates generally to a dynamic loadable computer software architecture, and more specifically to dynamically configuring a run-time library for different input models.

Software Internationalization

Software that is configured for use in more than one country is commonly referred to as internationalized software. As an example, an internationalized software program in Korea should be able to use local Korean output methods and the same software program in Germany should be able to use local German output methods. In order to support internationalized software, binary files of the software should be executable in any international locale without the user having to modify or re-compile the software. In order to do this, software developers distinguish between portions of the software that are locale independent and portions that are locale dependent. The task of configuring locale dependent portions of software falls upon localization engineers.

Under the X Window System X library of application programming interfaces (APIs), there are three major categories of locale dependent APIs: text output methods (XOM), text input methods (XIM), and implementations of the text handling functions (XLC). XOM relates to the way text is displayed in terms of fonts, rendering direction, etc. and XIM relates to the way textual characters are composed, such as European languages and East Asian languages.

There are two general subclasses of XIM, a remote server model (also referred to as a remote IM or a server method model) and a local library model (also referred to as a local IM or a local method model). In the past, there has been a clear distinction regarding which languages utilize which model. For example, languages such as English, French, and German used a local library model, and languages such as Chinese, Korean, and Japanese used a remote server model. Traditionally this distinction occurred because European languages required relatively simple sequences of keyboard strokes to compose letters, whereas East Asian languages required relatively complex sequences of keyboard strokes to compose characters.

In German, for example, it is relatively easy to enter an "Ä" character by typing a series of characters such as, "<meta-key>+A+", thus a simple program can handle the mapping of keystrokes to letters. Further, because many European keyboards contain specialized characters on the keyboard, there is generally no need to have a separate remote server to get key inputs for these languages. With East Asian languages, such as Chinese, because a large dictionary of words and a detailed knowledge about the language is required, a complicated text input mechanism is required.

FIG. 1 illustrates a typical remote server model and a local library model. The local library model is preferred to the remote server model in terms of responsiveness because the local library model does not include the overhead of having to perform method calls to a remote server. The remote server model, however, is preferred to the local library model in terms of system resource economics because only one instance of a remote server model provide input mechanisms to multiple clients, application programs.

Typically European languages have only been implemented using the local method model and East Asian languages have only been implemented using the server method model. There are times, however, when it would be desirable to have more than one input method model for each language. For example, if the user runs many applications in a single workspace at the same time, a server method model may be more efficient in terms of system resources, even with European languages. Similarly, if the user runs only a few applications., a local method model may be more efficient in terms of performance, even with East Asian languages.

The Korean language will serve as an example of the preferred embodiment described below. The Korean language includes two types of characters, Hangul characters (Korean phonetic characters) and Hanja (ideographic characters imported from China). Although Hangul is the more common form for text input, Hanja is also used on occasion. The Korean language is presently implemented using the server method model, as described in Yoon et al., "A Korean Environment for The X Window System," The X Resource, Issue 15, 1995, herein incorporated by reference for all purposes.

Monolithic Model

FIG. 2 illustrates one method for incorporating API implementations in the X library to handle locale dependent requirements. FIG. 2 includes an application program 10 and a run-time library 20. Run-time library 20 includes a plurality of locale dependent API implementations including XOMs 30 and 40, XIMs 50 and 60, and XLCs 70 and 80.

When locale sensitive API implementations are needed, the requirements of the locale are determined and a function vector points to the required locale sensitive API implementations. In one locale, for example, application program 10 will require the API implementations in XOM 30 in order to display text in a top to bottom format such as Chinese, whereas in another locale, application program 10 will require the API implementations in XOM 40 in order to display text in a right-to-left format such as Hebrew. Similarly, in one locale application program 10 may require the API implementations in XIM 50 to compose Chinese characters, whereas in another locale, application program 10 may require the API implementations in XIM 60 to compose Russian characters.

This monolithic approach has several drawbacks. For example when newer or improved API implementations of XIMs, XOMs and XLCs are developed, the user is unable to utilize the new API implementations without rebuilding the entire run-time library. Further the resources required for the run-time library will necessarily be excessive because, the API implementations not required by a locale are nevertheless always resident on the host computer.

Single Shared Object Model

FIG. 3 illustrates another method for incorporating API implementations in the X library to handle locale dependent requirements. FIG. 3 includes an application program 100, a run-time library 110, and a plurality of library modules 120 and 130 which can be loaded at run-time. Each module 120 and 130 includes locale dependent API implementations such as XOM 140, XIM 150, and XLC 160.

FIG. 3 illustrates a single shared object X library model. Under this model, the X library, run-time library 110, is loaded independently from library modules 120 and 130. Library modules 120 or 130 are developed by localization engineers which provide the appropriate API implementations of XOM, XIM, and XLC for the locale. At run-time, the library module, for example module 130, fitting the user's requirements is loaded when run-time library 110 is loaded.

This single shared object approach has several drawbacks. For example, when new or improved API implementations of XIMs, XOMs and XLCs are developed by the localization engineer, the user is unable to utilize the new API implementation without re-building the run-time library module. For example, since an API implementation of XOM or of XLC may not be revised when a new API implementation of XIM is developed or is required, each new library module will include redundant, duplicate copies of the existing API implementations of XOM and XLC.

Thus what is required is a computer architecture that allows users to dynamically configure a run-time library for different API implementations, especially with respect to API implementations of XIMs for different languages.

SUMMARY OF THE INVENTION

The present invention provides methods and apparatus for dynamically loading library modules. In particular, the present invention allows for dynamic loading of input method (IM) models for application programs.

According to a preferred embodiment, a method implemented on a computer system for loading a module for input and for loading a module for output for an application program, includes the steps of selecting the module for input, and loading the module for input. The method also includes the steps of selecting a module for output, and loading the module for output at a time different from the loading of the module for input.

According to another embodiment of the present invention, a computer system including a computer program for enabling loading of a module for input and loading a module for output for an application program, includes code that selects the module for input, and code that loads the module for input. The computer system also includes code that selects the module for output, and code that loads the module for output. The loading of the module for output occurs at a time different from the loading of the module for input. The computer-readable memory stores the different codes.

DESCRIPTION OF THE PREFERRED EMBODIMENT

System Configuration

Figure 4:
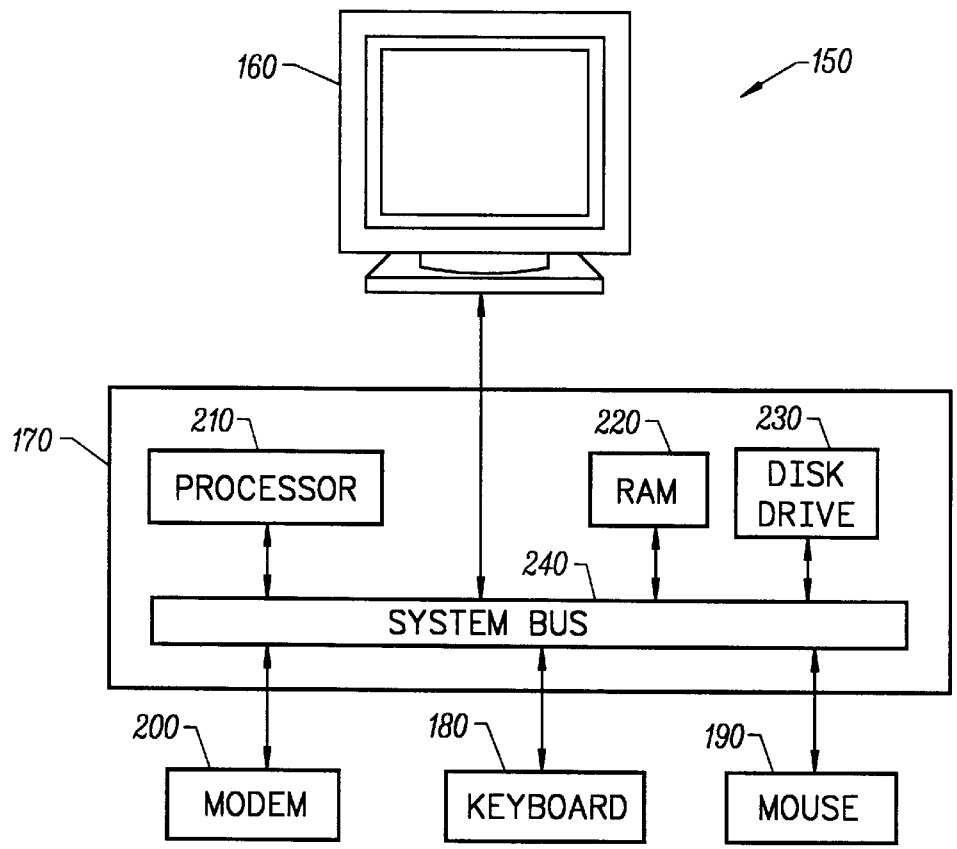
FIG. 4 is a block diagram of a system according to a preferred embodiment of the present invention.

FIG. 4 is a block diagram of a system 150 according to a preferred embodiment of the present invention. System 150 includes, preferably, a display monitor 160, a computer 170, a keyboard 180, a mouse 190, and a modem 200. Computer 170 includes familiar computer components such as a processor 210, memory storage devices such as a random access memory (RAM) 220 and a disk drive 230, and a system bus 240, interconnecting the above components. Mouse 190 is but one example of a graphical input device; a trackball is another example. Modem 200 is but one example of a device enabling system 150 to be coupled to a network; a network interface card is another example. RAM 220 and disk drive 230 are examples of computer-readable memory (tangible media) for storage of the herein described computer code and computer programs; other types of computer-readable media include floppy disks, removable hard disks, optical storage media such as CD-ROMS and bar codes, and semiconductor memories such as flash memory and read-only-memories (ROMs).

In a preferred embodiment, system 150 includes a SPARCStation™ 10 computer from Sun Microsystems, Inc., running the Solaris™ operating system from Sun Microsystems, Inc. and The X Window System, version 11, release 6, also referred to as X11R6. Further details regarding the X11R6 specification is available from the X Consortium Group. The X11R6 specification is incorporated by reference for all purposes.

FIG. 4 is representative of but one type of system for embodying the present invention. It will be readily apparent to one of ordinary skill in the art that many system types and hardware and software configurations are suitable for use in conjunction with the present invention, such as a computer running the X Window System, version 11, release 5, (X11R5), an IBM-PC compatible computer having Windows™ NT operating system, from Microsoft Corporation, a Macintosh™ computer from Apple Computer Corporation having a AUX operating, system, a computer workstation, or a system utilizing a "dumb" terminal connected to a processing resource. Further details regarding the X11R5 specification is available from the X Consortium Group, Cambridge, Mass. The X11R5 specification is incorporated by reference for all purposes.

Split Shared Model

The preferred embodiment of the present invention allows the user to select appropriate run-time modules, such as API implementations of XIMs, XOMs, and XLCs, for the user's application.

Figure 5:
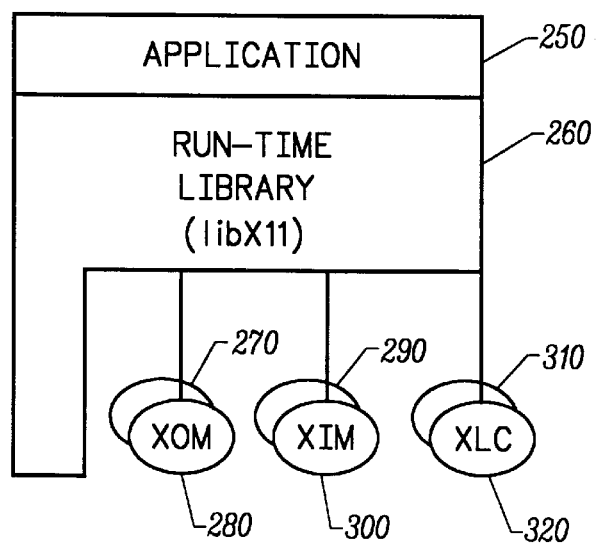
FIG. 5 is a block diagram of a system including a preferred embodiment of the present invention.

FIG. 5 is a block diagram of a system including a preferred embodiment of the present invention. FIG. 5 includes an application program 250, a run-time library 260, and a plurality of locale dependent API implementations such as XOM 270 and 280, XIM 290 and 300, and XLC 310 and 320.

Under this model, run-time library 260 is loaded with the locale dependent API implementations according to the user's needs. Each API implementation of XOMs such as 270 and 280, of XIMs such as 290 and 300, and of XLCs 310 and 320 are developed by localization engineers. At run-time, run-time library 260 loads API implementations of XOMs, XIMs, and XLCs modules required for that particular application.

As an example, in a first application the user requires text output in the vertical format, such as Chinese characters. In this case, API implementation XOM 270 is used. At the same time, text input can be using, for example, English characters with API implementation XIM 290, or using Chinese characters with API implementation XIM 300. In a second application, however, the same user requires text output in the right-to-left format, such as Hebrew. In this case, API implementation XOM 280 is used.

Figure 1:
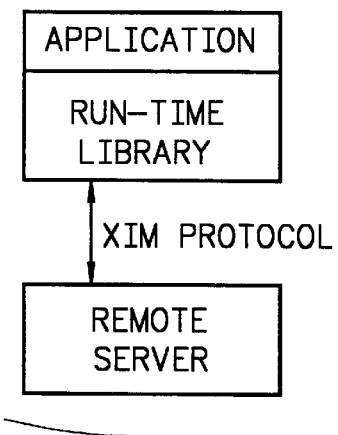
FIG. 1 illustrates a typical remote server model and a local library model.
Figure 1:
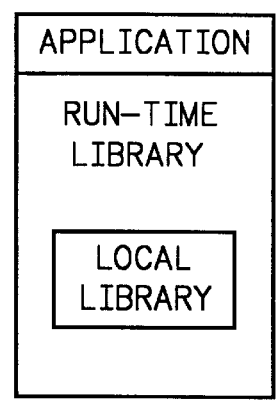
Figure 2:
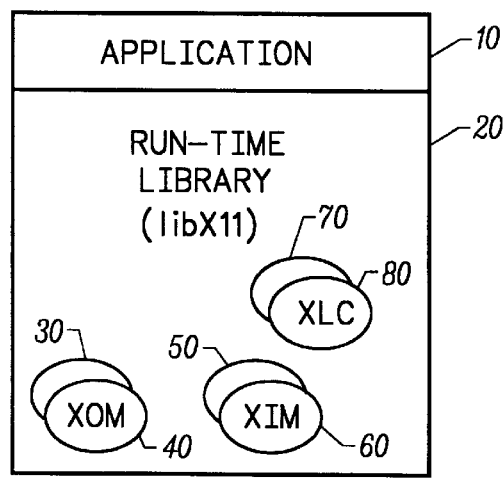
FIG. 2 illustrates one method for defining API implementations in the X library to handle locale dependent requirements.
Figure 3:
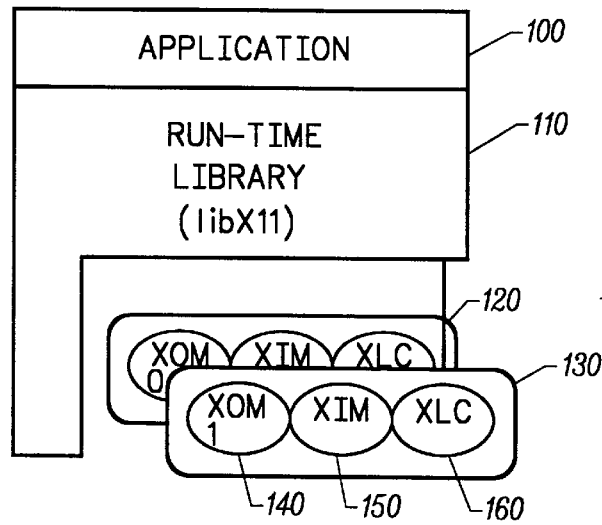
FIG. 3 illustrates another method for defining API implementations in the X library to handle locale dependent requirements.

By enabling the loading of the API implementations of XIM, XOM, and XLC modules individually the user need not rely upon localization engineers to create pre-defined groups of modules, as was illustrated in FIGS. 2 and 3. Instead, the user selects the particular combination of XIM, XOM, and XLC API implementations appropriate for the application program.

Table 1 illustrates an example of a configuration file usable for the split shared model described. The first column is a token to distinguish the type (category) of the object, such as XIM, XOM, etc. The second column is the name of the object. The third column specifies an entry point for the object.

TABLE 1

Sample X Locale object configuration

| # CATEGORY (XLC/XIM/XOM) | SHARED_LIBRARY_NAME | FUNCTION_NAME |
|---|---|---|
| # | | |
| # XI18N objects table for ja locale | | |
| # | | |
| XLC xlibi18n | _XlcGenericLoader | # XLC_open |
| XIM ximp40 | _Ximp_OpenIM | # XIM_open |
| XIM ximcp | _Xim_OpenIM | # XIM_open |
| XIM ximll | _llopenim | # XIM_open |
| XOM xomLTRTTB | _XomGenericOpenOM | X XOM_open |

In Table 1, only one API implementation of XLC and XOM objects are described (Xlibil8n and xomLTRTTB, respectively). However, there are three different API implementations of XIMs: ximp40, ximcp, and ximll; ximp40 is the API implementation of XIM for Ximp4.0 XIM protocol; ximcp is the API implementation of XIM for the X11R6 common XIM protocol; and XIM11 is the API implementation of XIM for a local IM. When multiple objects are defined for the same category, preferably they are placed in a prioritized order. Thus, if a particular preferred API implementation of an XIM is not available, the next API implementation of XIM in the configuration file will be loaded.

Ximp40 and ximcp API implementations are well known to one skilled in the art. Further information about ximp40 is found in Narita et al. "Protocol Specification for the Distributed Input System on the X Window System", Version 11 Revision 4.0", X Consortium, 1992. Further information about X11R6 is found in Narita et al. "Input Method Protocol Version 1.0", X Consortium, X11, Release 6, 1994 and Narita et al. "Overview of the Input Method Protocol," The X Resource Issue 10, Aerial & Associates, 1994. These references are incorporated by reference for all purposes.

XIM Implementations

The preferred embodiment of the present invention allows the user to use selected API implementations of XIMs for handling keyboard events (text entry events). There are two current API implementation models for XIM, including a server method model and local method model. As noted in the Background section, local run-time libraries (local method model) are currently used to handle keyboard events when working with European languages, and server methods (server method models) are currently used to handle keyboard events when working with East Asian languages, such as Korean.

In Korean, Hangul and Hanja text entry and output are both implemented using the server method model. Since approximately five to ten thousand different symbols, each representing different words, need to be available on a typical Hanja text processor, the server method model is an appropriate input model. However, since Hangul includes a limited number of character symbols, (about 32) which are combined to form words, a local method model for input is more appropriate than the server method model.

Figure 6A:
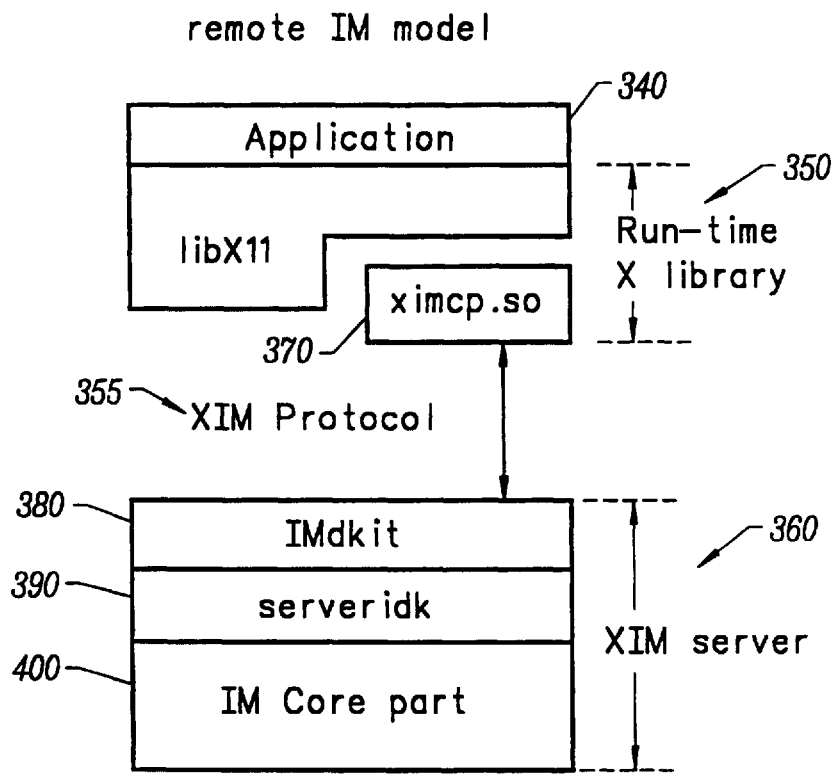
FIGS. 6a and 6b are block diagrams of a system including a preferred embodiment of the present invention.
Figure 6B:
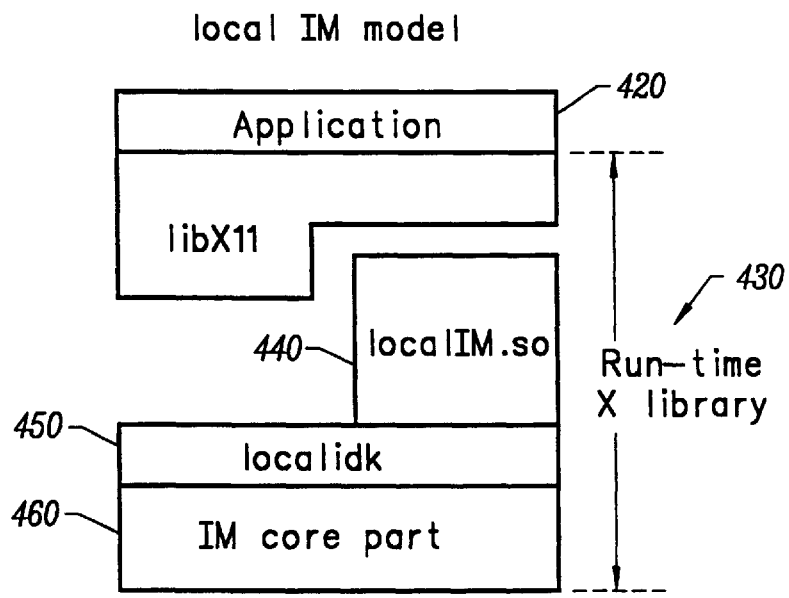

FIGS. 6a and 6b are block diagrams of a system including a preferred embodiment of the present invention. Depending upon the contents of the configuration file, API implementations of a local method model or a server method model for a particular language are enabled.

FIG. 6a illustrates a server method model according to a preferred embodiment of the present invention. FIG. 6a includes an application program 340, a run-time library 350 and a server 360. Run-time library 350 includes a module 370, and server 360 includes modules 380–400. Run-time library 350 and server 360 communicate through a well known and defined XIM Protocol 355. See Narita et al.

XIM Protocol is a protocol defined on top of transmission protocols such as TCP/IP. Therefore, a server method may be resident on the user's machine, a network machine, or any other remote machine.

Module 370 includes an API implementation, ximcp.so, which is called by application program 340 when a server method model for handling text entry is desired. Module 370 is a bi-directional client-side protocol handler that encodes calls from application program 340 into XIM Protocol 355 and decodes calls from XIM Protocol 355 for application program 340.

Server 360 includes three layers. Module 380 is a bi-directional server-side protocol handler that decodes calls from module 370 in XIM Protocol 355 and encodes calls to XIM Protocol 355 for module 370. The decoded calls are passed to module 390. Module 390 receives the calls from module 380 and translates these calls into method calls to module 400.

Module 400 is defined as an input method core (IM core). The IM core provides "methods" which handle the text entry events. The IM core is designed to run within server 360, or within a run-time library.

FIG. 6b illustrates a local method model according to a preferred embodiment of the present invention. FIG. 6b includes an application program 420 and a run-time library 430. Run-time library 430 includes modules 440–460.

Module 440 includes an API implementation, localIM.so, which is called upon by application program 340. Module 440 is dynamically loaded when a local method model for handling text entry is desired, and module 440 provides method stubs to application program 420.

Module 450 receives the stub calls from module 440 and translates these calls into method calls to module 460.

Similar to Module 400 above, module 460 is defined as an input method core (IM core). The IM core provides "methods" which handle the text entry events.

In a preferred embodiment of the present invention, modules 400 and 460 include the same method interfaces, however the exact implementations may be different. Thus whether an application program uses a server method model or a local method model to handle text entry events, only one set of IM core methods is required for any one application in memory. To provide this functionality, preferably modules 450 and 390 are instances of a base class of input developers' kit (idk) objects which call methods in the IM core.

Figure 7:
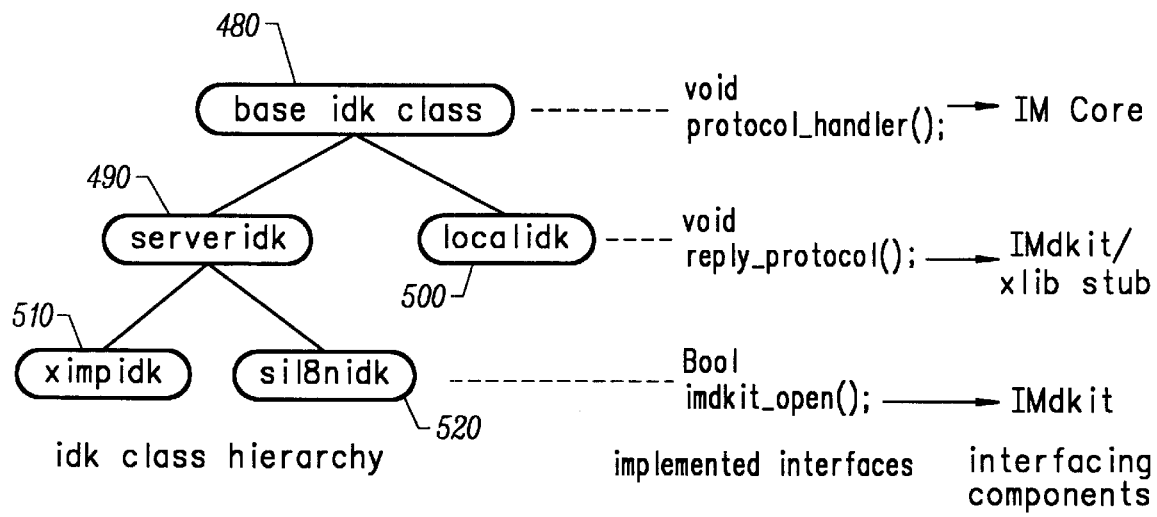
FIG. 7 illustrates a contemplated class hierarchy for modules.

FIG. 7 illustrates a contemplated class hierarchy for modules 400 and 460. As illustrated, base class 480 provides an interface to an IM Core and instances 490 and 500 are used to handle specific interface issues with the TM Core for the server method model and the local method model, respectively. Instances 510 and 520 provide specific interface implementations of the server method model. Specifically, instance 510 provides support for Ximp4.0 protocol and instance 520 provides X11R6 common XIM protocol, as previously discussed.

Figure 8:
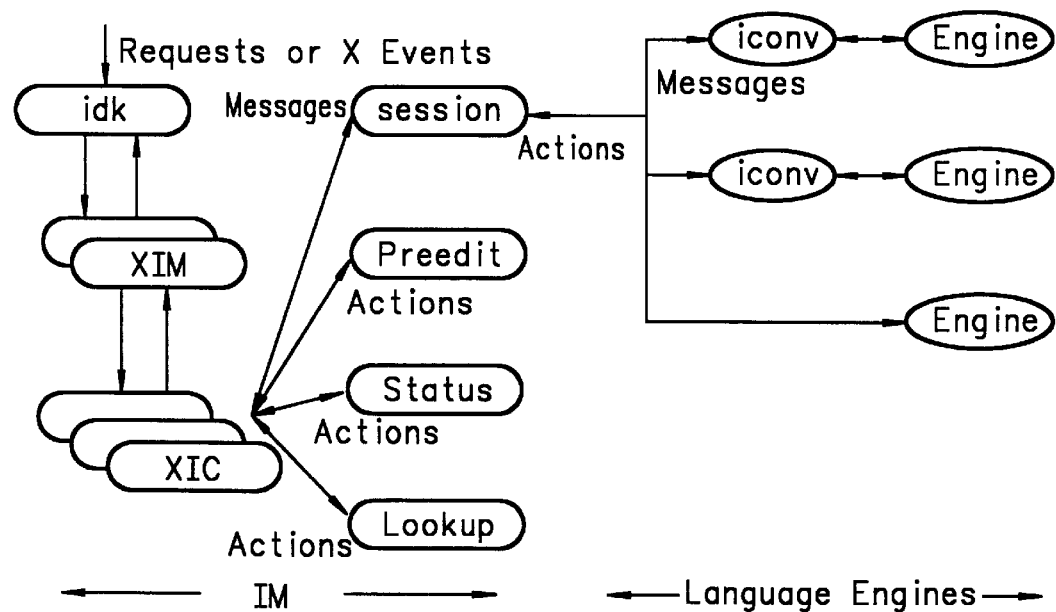
FIG. 8 illustrates interfaces among internal objects of the IM Core part.

FIG. 8 illustrates interfaces among internal objects of the IM Core part. The base idk object creates XIM objects corresponding to the application's call of XOpenIM( ) function. Similarly, the XIM object creates XIC objects corresponding to the application's XCreateIC( ) call. When the application's requests or the X events (user's key input, for example) reach the XIC objects, the XIC objects forward the messages to the language engines (conversion engines) through an object called "session". Then, the language engines invoke appropriate actions triggered by these messages. The engine actions are interpreted by the XIC objects, and are dispatched to the appropriate target objects, such as Preedit objects, Status objects, and Lookup objects for rendering, and to the parent objects (XIM) for replying messages back to the application. Here, Preedit objects and Status objects represent the preedit rendering and the status rendering respectively. Lookup object is used to show the menus from which the user can select a candidate. For further information regarding preedit, status, and lookup objects, see Yoon et al. for further information.

FIG. 8 also illustrates how the XIM architecture can fit into the multi-lingual environment. Each instance of XIC creates a session object, which represents a group of different language engines. These language engines can provide text input mechanisms for various languages. A code conversion module (iconv(3), for example) may be needed between the session and a language engine, in case where the language engine and the IM (the left side of FIG. 8) run in different character encoding schemes. For example, if the user wants to input Japanese and Russian texts in a single text editor, FIG. 8 allows a single XIC to connect with a Russian language engine and a Japanese language engine. The single implementation of the IM in FIG. 8 supports both the local method model and the server method model for the Russian language or Japanese language.

Performance

In the split shared object model of the internationalized X library, one of the major concerns is the run-time performance. Since the run-time symbol name resolution is done for each shared object, the split shared object model has a disadvantage in this regard. For example, suppose that both XOM and XIM objects refer to the function A, which resides in the locale independent part of the X library (libX11 in FIG. 2). If XOM and XIM are in the same shared object, the symbol name resolution for function A occurs only once. However, if XOM and XIM are separated, it occurs twice. Therefore, if a large number of symbol names are commonly referred to by the XOM/XIM/XLC objects, it would require extra overhead to do the symbol name resolution.

Once a function is called in a shared object, the subsequent calls of the same function do not require any symbol name resolution. Also, even the 1st call of a function may not need to resolve all the symbol names, since some of them may have been resolved already by other function calls.

The execution time of some of the XIM/XOM functions, is illustrated in Table 2. The actual implementation of the XOM/XIM/XLC objects used in this measurement are all based on the X11R6 sample implementation of the patch level 13. The numbers shown in Table 2 are the execution time in the split shared object model, normalized by the time in the single shared object model. (The data 1.00 means that the execution time in the split shared object model is same as that in the single shared object model, and the smaller the number is, the better the performance).

According to the measurement results, the visible performance degradation only occurs when an application calls XOpenIM( ), XGetIMValues( ), or XOpenOM( ) for the first time, and there is no significant performance hit in any calls of XCreateIC( ) or XSetICValues( ). Since the absolute time required to execute these functions is very small (typically from 0.0001 seconds to 0.05 seconds), users will typically not notice the difference.

TABLE 2

| Relative performance in the split shared object model | | |
|---|---|---|
| Function name | 1st call | 2nd call |
| XOpenIM() | 1.21 | 1.01 |
| XGetIMValues() | 1.88 | 1.00 |
| XCreateIC() | 1.01 | 1.00 |
| XSetICValues() | 1.00 | 1.00 |
| XOpenOM() | 1.10 | 1.02 |
| XGetOMValues() | 1.00 | 1.00 |
| XCreateOC() | 1.01 | 1.00 |

One of the motivations to integrate the local IM (local method model) and the remote IM (server method model) is to offer better performance depending on the user's actual needs. Preliminary results show that the local IMA provides better interactive performance especially when the input style is on-the-spot (XIMPreeditCallbacks) style. For instance, the local IM shows approximately 15% better results than the remote IM model in case that 400 Japanese characters are continuously input. The remote IM is better in terms of the application's initialization time. The local IM model takes 57% longer time than the remote IM model in case that 10 applications are started simultaneously in Japanese locale. If only two applications are started simultaneously, the local IM model takes 10% longer.

Conclusion

In the foregoing specification, the invention has been described with reference to specific exemplary embodiments thereof. Many changes or modifications are readily envisioned. For example, The X Windows Output Methods (XOM) may be configured in terms of either a local method model and/or a server method model as was illustrated with regard to XIM, further, multiple XOMs may be loaded can also be loaded at the same time, again, as was illustrated with regard to XIM.

The specification and drawings are, accordingly, to be regarded in an illustrative rather than in a restrictive sense. It will, however, be evident that various modifications and changes may be made thereunto without departing from the broader spirit and scope of the invention as set forth in the claims.

We claim:

1. A method implemented on a computer system for dynamically loading an input run-time module and an output run-time module for an application program, comprising the steps of:
   retrieving an external configuration file
   selecting the input run-time module in response to the external configuration file;
   loading the input run-time module at run-time;
   selecting the output run-time module in response to the external configuration file, the input run-time module physically divided into a different library from the output run-time module; and
   loading the output run-time module at run-time independently from the loading of the input run-time module;
   wherein the step of selecting the input run-time module comprises the step of selecting a local method model or a server method model; and
   wherein the step of loading the input run-time module comprises the steps of:
      loading an input method core object, the input method core object including a plurality of input methods;
      loading a local translator run-time module in response to a selection of the local method model, the local translator for invoking methods in the input method core object;
      loading an input method stub run-time module in response to the selection of the local method model, the input method stub run-time module for passing input requests from the application program to the local translator runtime module;
      loading a client-side protocol handler in response to a selection of the server method model, the client-side protocol handler for encoding input requests from the application program;
      loading a server-side protocol handler in response to the selection of the server method model, the server-side protocol handler for decoding the input requests from the application program; and
      loading a server translator in response to the selection of the server method model, the server translator for translating the input requests from the application program and for invoking methods in the input method core object.

2. The method of claim 1 wherein the output run-time module is separately selected from the input run-time module.

3. The method of claim 1 wherein a configuration file specifies the input run-time module.

4. The method of claim 1 wherein a configuration file specifies the output run-time module.

5. The method of claim 1 wherein the input run-time module is configured as the server method model.

6. The method of claim 1 wherein the input run-lime module is configured as the local method model.

7. The method of claim 6 wherein the local method model supports an East Asian language.

8. A computer system including a computer program for enabling dynamic loading of an input run-time module and an output run-time module for an application program, the computer system comprising:
   a computer-readable memory including:
      code that retrieves the external configuration file
      code that selects the input run-time module in response to the external configuration file;
      code that loads the input run-time module at run-time;
      code that selects the output run-time module in response to the external configuration file, the input run-time module physically divided into a different library from the output run-time module; and
      code that loads the output run-time module at run-time independently from the loading of the input run-time module;
   wherein the code that selects the input run-time module comprises code that selects a local method model or a server method model; and
   wherein the code that loads the input run-time module comprises:
      code that loads an input method core object, the input method core object including a plurality of input methods;
      code that loads a local translator run-time module in response to a selection of the local method model, the local translator for invoking methods in the input method core object;
      code that loads an input method stub run-time module in response to the selection of the local method model, the input method stub run-time module for passing input requests from the application program to the local translator run-time module;
      code that loads a client-side protocol handler in response to a selection of the server method model, the client-side protocol handler for encoding input requests from the application program;
      code that loads a server-side protocol handler in response to the selection of the server method model, the server-side protocol handler for decoding the input requests from the application program; and
      code that loads a server translator in response to the selection of the server method model, the server translator for translating the input requests from the application program and for invoking methods in the input method core object.

9. The computer system of claim 8 further comprising a configuration file in the computer-readable memory, the configuration file specifying the input run-time module.

10. The computer system of claim 8 further comprising a configuration file in the computer-readable memory, the configuration file specifying the output run-time module.

11. The computer system of claim 8 wherein code representing the input run-time module is stored in the computer-readable memory and includes code representing an X Window System input method model.

12. The computer system of claim 8 wherein the code representing the input run-time module is stored in the computer-readable memory and includes code representing the server method model.

13. The computer system of claim 8 wherein the code representing the input run-time module is stored in the computer-readable memory and includes code representing the local method model.

14. The computer system of claim 8 wherein code representing the output run-time module is stored in the computer-readable memory and includes code representing an X Window System output method model.

15. A method implemented on a computer for dynamically configuring an input run-time module for an application program, comprising the steps of:

selecting a model for the input run-time module, the model comprising a local method model or a server method model;

loading an input method core object, the input method core object including a plurality of input methods;

loading a local translator run-time module in response to a selection of the local method model, the local translator for invoking methods in the input method core object;

loading an input method stub run-time module in response to the selection of the local method model, the input method stub run-time module for passing input requests from the application program to the local translator run-time module;

loading a client-side protocol handler in response to a selection of the server method model, the client-side protocol handler for encoding input requests from the application program;

loading a server-side protocol handler in response to the selection of the server method model, the server-side protocol handler for decoding the input requests from the application program; and loading a server translator in response to the selection of the server method model, the server translator for translating the input requests from the application program and for invoking methods in the input method core object.

16. The method of claim 15 wherein a configuration file specifies the model.

17. The method of claim 15 wherein the model is an X Window System input method model.

18. The method of claim 15 wherein the model is the server method model.

19. The method of claim 18 wherein the server method model supports a European language.

20. The method of claim 15 the model is the local method model.

21. The method of claim 20 wherein the local method model supports an East Asian language.

22. A computer system including a computer program for enabling dynamic configuration of an input run-time module for an application program, the computer system comprising:

a computer-readable memory including:

code that selects a model for the input run-time module, the model comprising a local method model or a server method model;

code that loads an input method core object, the input method core object including a plurality of input methods;

code that loads a local translator run-time module in response to a selection of the local method model, the local translator for invoking methods in the input method core object;

code that loads an input method stub run-time module in response to the selection of the local method model, the input method stub run-time module for passing input requests from the application program to the local translator run-time module;

code that loads a client-side protocol handler in response to a selection of the server method model, the client-side protocol handler for encoding input requests from the application program;

code that loads a server-side protocol handler in response to the selection of the server method model, the server-side protocol handler for decoding the input requests from the application program; and code that loads a server translator in response to the selection of the server method model, the server translator for translating the input requests from the application program and for invoking methods in the input method core object.

23. The computer system of claim 22 wherein the input run-time module is an X Window System input method model.

24. The computer system of claim 22 wherein the input run-time module is physically separated from an output run-time module.

25. The computer system of claim 22 wherein the code that selects the model selects the model in response to a configuration file.

26. The computer system of claim 22 wherein the model is the server method model.

27. A computer system configured to dynamically load an input run-time module for an application program, the computer system comprising:

a model selector for selecting a model for the input run-time module, the model comprising a local method model or a server method model;

a core object loader for loading an input method core object, the input method core object including a plurality of input methods;

a local translator loader for loading a local translator run-time module in response to a selection of the local method model, the local translator for invoking methods in the input method core object;

a stub loader for loading an input method stub run-time module in response to the selection of the local method model, the input method stub runtime module for passing input requests from the application program to the local translator run-time module;

a client protocol handler for loading a client-side protocol handler in response to a selection of the server method model, the client-side protocol handler for encoding input requests from the application program;

a server protocol handler for loading a server-side protocol handler in response to the selection of the server method model, the server-side protocol handler for decoding the input requests from the application program; and a server translator loader for loading a server translator in response to the selection of the server method model, the server translator for translating the input requests from the application program and for invoking methods in the input method core object.

28. The computer system of claim 27 wherein the input run-time module is an X Window System input method model.

29. The computer system of claim 27 further comprising an external X locale object configuration file for defining the input run-time module.

30. The computer system of claim 27 wherein the input run-time module is physically separated from an output run-time module.

31. The computer system of claim 27 wherein the model is the local method model.

* * * * *